United States Patent [19]

Narita et al.

[11] Patent Number: 4,997,296
[45] Date of Patent: Mar. 5, 1991

[54] CERAMIC BEARING AND METAL SHAFT ASSEMBLY

[75] Inventors: Yoshinori Narita; Yoshinori Hattori, both of Aichi, Japan

[73] Assignee: NGK Spark Plug Co., Ltd., Nagoya, Japan

[21] Appl. No.: 513,859

[22] Filed: Apr. 24, 1990

[30] Foreign Application Priority Data

Apr. 27, 1989 [JP] Japan ................................ 1-48913[U]

[51] Int. Cl.$^5$ ....................... F16C 33/62; F16C 19/04
[52] U.S. Cl. .................................. 384/492; 384/537; 384/907.1
[58] Field of Search ............... 384/492, 537, 584, 585, 384/907.1

[56] References Cited

U.S. PATENT DOCUMENTS

| 4,770,549 | 9/1988 | Rokkaku et al. | 384/492 |
| 4,792,244 | 12/1988 | Yamashita et al. | 384/492 |
| 4,808,014 | 2/1989 | Ueda et al. | 384/492 |
| 4,872,771 | 10/1989 | Ueno et al. | 384/492 |

Primary Examiner—Thomas R. Hannon
Attorney, Agent, or Firm—Foley & Lardner, Schwartz, Jeffery, Schwaab, Mack, Blumenthal & Evans

[57] ABSTRACT

A bearing includes an inner ring made of ceramics. A shaft is made of metal and fitted in the inner ring. The ceramics has a tensile strength equal to or larger than 50 Kg/mm$^2$, and the ceramics and the metal are determined so as to satisfy the relation of $\beta_2 - \beta_1 \leq 6 \times 10^{-6}$/°C. where $\beta_1$ is a coefficient of linear expansion of the ceramics and $\beta_2$ is a coefficient of linear expansion of the metal.

4 Claims, 2 Drawing Sheets

CERAMIC BEARING AND METAL SHAFT ASSEMBLY

BACKGROUND OF THE INVENTION

1. Field of the Invention

The present invention relates in general to ceramic bearings and more particularly to a ceramic bearing and metal shaft assembly for use in an atmosphere of a high temperature (about 200° C. or more)

2. Description of the Prior Art

When a bearing made of metal is used in an atmosphere of a high temperature, it deteriorates in both the corrosion resistance and the strength and furthermore it cannot be lubricated by oil, grease, etc. For this reason, in case of use in such an atmosphere of a high temperature, a bearing made of ceramics is employed since it is superior in the corrosion and wear resistance. When the ceramic shaft is used, a shaft to be supported thereby needs to be formed from the same ceramics as the bearing or a material nearly equal in a coefficient of linear expansion to the ceramics.

A problem of the prior art bearing and shaft assembly is that there is a difficulty in forming the ceramic shaft into a complicated shape, and therefore when the ceramic shaft needs to have a complicated shape an expensive manufacturing cost inevitably results. If the shaft is formed from an ordinary metal as carbon steel, chromium-molybdenum steel, etc., a considerable thermal expansion differential is caused between the bearing and shaft when the assembly is used in an atomosphere of a high temperature. Such a thermal expansion differential will cause a considerable stress in the cerarmic bearing and in the worst case damage or breakage of same. Accordingly, the shaft made of an ordinary metal is undesirable for use together with the ceramic bearing in an atmosphere of a temperature equal to or higher than 200° C.

SUMMARY OF THE INVENTION

In accordance with the present invention, there is provided an improved bearing and shaft assembly which comprises a bearing having an inner ring made of ceramics and a shaft made of metal and fitted in the inner ring for rotation therewith.

The ceramics has a tensile strength equal to or larger than 50 Kg/mm$^2$ at an ordinary temperature, and the ceramics and the metal are determined so as to satisfy the relation of $\beta_2 - \beta_1 \leq 6 \times 10^{-6}/°C$. where $\beta_1$ is a coefficient of linear expansion of the ceramics and $\beta_2$ is a coefficient of linear expansion of the metal.

This structure is effective for solving the above noted problem inherent in the prior art assembly.

It is accordingly an object of the present invention to provide an improved ceramic bearing and metal shaft assembly which makes it possible to form the shaft from an ordinary metal while assuredly preventing the ceramic bearing from being damaged or broken due to a thermal expansion differential between the bearing and shaft when used in an atmosphere of a high temperature.

It is a further object of the present invention to provide an improved ceramic bearing and metal shaft assembly of the above described character which is economical in cost.

It is a further object of the present invention to provide an improved ceramic bearing and metal shaft assembly of the above described character which is reliable in operation particularly when used in an atmosphere of a high temperature.

DESCRIPTION OF THE PREFERRED EMBODIMENTS

Figure 1:
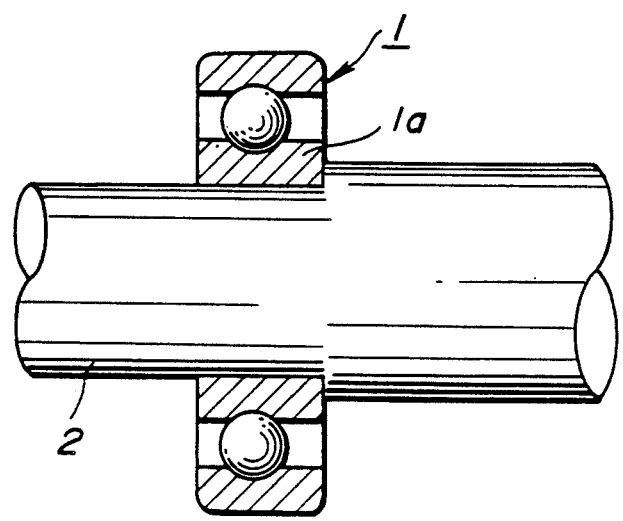
FIG. 1 is a sectional view of a ceramic bearing and metal shaft assembly according to an embodiment of the present invention.

Referring to FIG. 1, a ceramic bearing and metal shaft assembly includes a ball bearing 1 made of ceramics and a shaft 2 made of a heat resistant metal. The ceramic bearing 1 has, for example, the same size as a metal ball bearing identified by code No. 6206 according to JIS B1521 (Japanese Industrial Standard). i.e., the ball bearing 1 is made of silicon nitride or sialon and 30 mm in inner diameter. The ball bearing 1 is not necessarily an all ceramic ball bearing (i.e., the inner ring 1a, outer ring and balls are all made of ceramics) but at least the inner ring 1a is made of ceramics.

The metal shaft 2 is 30 mm in outer diameter and 100 mm in length and adapted to be joined with an inner ring 1a of the bearing 1 by loose fit or adapted to fit loosely in the inner ring 1a of the bearing 1 at an ordinary temperature. More specifically, the metal shaft 2 is fitted in the inner ring 1a of the bearing 1 to provide a clearance which is zero or more than zero.

Table 1 shows the maximum serviceable temperatures of the ceramic bearing and metal shaft assemblies having the zero clearance between the inner ring 1a and the metal shaft 2, in which examples 1–4 are embodiments of this invention and example 5 is provided for comparison. The maximum serviceable temperatures were obtained by subjecting the assemblies for the following breaking test. In the test, each assembly was heated to a predetermined temperature and held thereat for an hour within an oven, and thereafter cooled to an ordinary temperature or room temperature. This heating and cooling cycle was repeated three times. Then, the assembly was heated to a higher temperature and subjected to the similar heating and cooling cycle three times. The above test was continued until a breakage occurs in the ceramic bearings 1, whereby to test the assemblies for the serviceable temperatures.

From Table 1, it will be understood that when cobalt-nickel steel of coefficient of linear expansion $8 \times 10^{-6}/°C$. is employed for forming the shaft 2 the assembly becomes serviceable at the temperature of 300° C. without causing any damage of the bearing 1 made of silicon nitride, and when a hard alloy of coefficient of linear expansion of $5.3 \times 10^{-6}/°C$. is employed for forming the shaft 2 the assembly is serviceable at the temperature of 500° C. without causing any damage of the bearing 1.

According to the present invention, the materials for the bearing and shaft of the assembly are determined so as to satisfy the relation of $\beta_2 - \beta_1 \leq 6 \times 10^{-6}/°C$. where $\beta_1$ is the coefficient of linear expansion of the material of the ceramic bearing 1 and $\beta_2$ is the coefficient of linear expansion of the material of the shaft 2. In this connection, it will be understood from Table 1 that the bearing and shaft assembly of this invention is serviceable at the temperature higher than 200° C.

Figure 2:
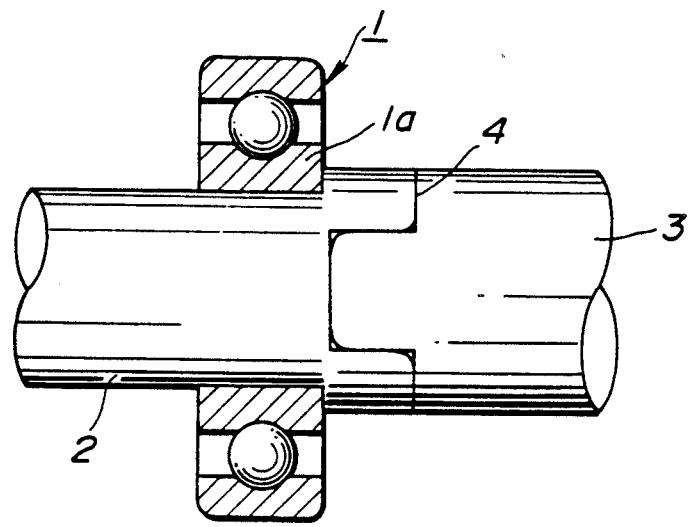
FIGS. 2 to 4 are views similar to FIG. 1 but show further embodiments of the present invention.
Figure 3:
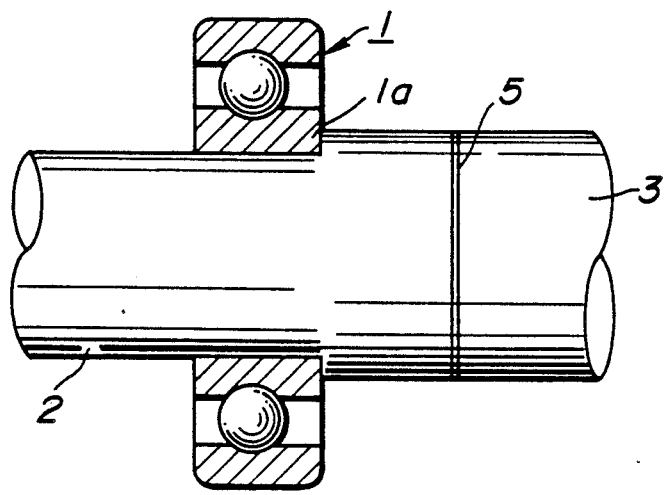

In the meantime, while the shaft 2 has been described and shown as being formed from a heat resistant metal throughout the overall length thereof, this is not limitative but the shaft 2 may be formed from a heat resistant metal only at the portion for joining with the inner ring 1a of the bearing 1 as shown in FIGS. 2 and 3, and the shaft 2 may be joined with a shaft 3 made of an ordinary steel as chromium-molybdenum steel, etc.

FIG. 2 shows an embodiment in which the shafts 2 and 3 are joined together by shrink fit.

FIG. 3 shows an embodiment in which the shafts 2 and 3 are welded together at 5.

By the embodiments of FIGS. 2 and 3, the shaft portion 3 can be formed from an ordinary metal and therefore the assembly can be economical in cost.

Figure 4:
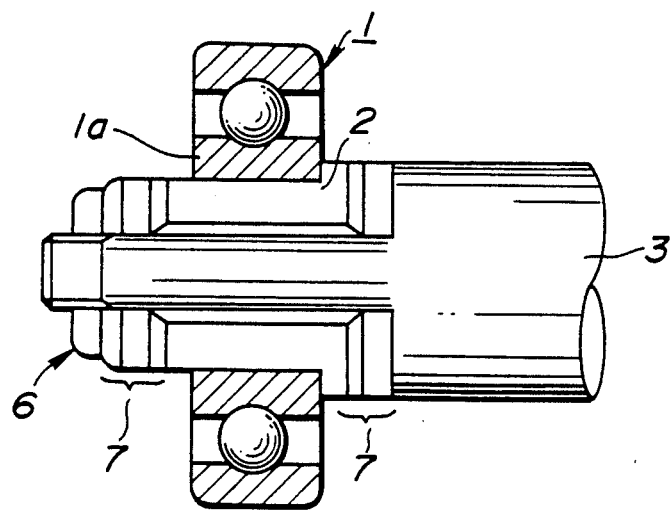

FIG. 4 shows a coupling in which a bushing 2 is made of a heat resistant metal and carried by the ceramic bearing 1. The bushing 2 is secured to the shaft 3 made of ordinary steel with a nut 6 and washers 7. This embodiment can produce the same effect as the above embodiments of FIGS. 2 and 3.

in which said ceramics and said metal are determined so as to satisfy the relation of $$\beta_2 - \beta_1 \leq 6 \times 10^{-6} /°C.$$

where $\beta_1$ is a coefficient of linear expansion of said ceramics and $\beta_2$ is a coefficient of linear expansion of said metal.

2. A bearing and shaft assembly comprising:
a bearing having an inner ring made of ceramics;
a shaft made of metal and fitted in said inner ring for rotation therewith;
in which said ceramics has a tensile strength equal to or larger than 50 Kg/mm² at an ordinary temperature;
in which said ceramics and said metal are determined so as to satisfy the relation of $$\beta_2 - \beta_1 \leq 6 \times 10^{-6} /°C.$$

where $\beta_1$ is a coefficient of linear expansion of said

TABLE 1

| EXAMPLE NO. | BEARING MATERIAL | COEFFICIENT OF LINEAR EXPANSION $\beta_1$ | SHAFT MATERIAL | COEFFICIENT OF LINEAR EXPANSION $\beta_2$ | SERVICEABLE TEMPERATURE |
|---|---|---|---|---|---|
| INVENTION | | | | | |
| 1 | SILICON NITRIDE (TENSILE STRENGTH OF 53 Kg/mm²) | 2.8 × 10⁻⁶/°C. | COBALT-NICKEL STEEL | 8 × 10⁻⁶/°C. | 300° C. |
| 2 | SILICON NITRIDE (TENSILE STRENGTH OF 53 Kg/mm²) | 2.8 × 10⁻⁶/°C. | HARD ALLOY | 5.3 × 10⁻⁶/°C. | 500° C. |
| 3 | SIALON (TENSILE STRENGTH OF 66 Kg/mm²) | 3.1 × 10⁻⁶/°C. | COBALT-NICKEL STEEL | 8 × 10⁻⁶/°C. | 350° C. |
| 4 | SIALON (TENSILE STRENGTH OF 66 Kg/mm²) | 3.1 × 10⁻⁶/°C. | HARD ALLOY | 5.3 × 10⁻⁶/°C. | 550° C. |
| 5 (FOR COMPARISON) | SILICON NITRIDE (TENSILE STRENGTH OF 53 Kg/mm²) | 2.8 × 10⁻⁶/°C. | CHROMIUM-MOLYBDENUM STEEL | 12 × 10⁻⁶/°C. | 200° C. |

What is claimed is:

1. A bearing and shaft assembly comprising:
a bearing having an inner ring made of ceramics;
a shaft made of metal and fitted in said inner ring for rotation therewith;
in which said ceramics has a tensile strength equal to or larger than 50 Kg/m² at an ordinary temperature;

ceramics and $\beta_2$ is a coefficient of linear expansion of said metal; and
in which said shaft is long enough to project axially from said inner ring of said bearing.

3. A bearing and shaft assembly as claimed in claim 2, further comprising a second shaft made of ordinary steel, said second shaft being axially aligned with said first mentioned shaft and integrally joined with same.

4. A bearing and shaft assembly as claimed in claim 2 wherein said shaft is attached to said inner ring of said bearing by loose fit.

* * * * *